Patented Apr. 27, 1948

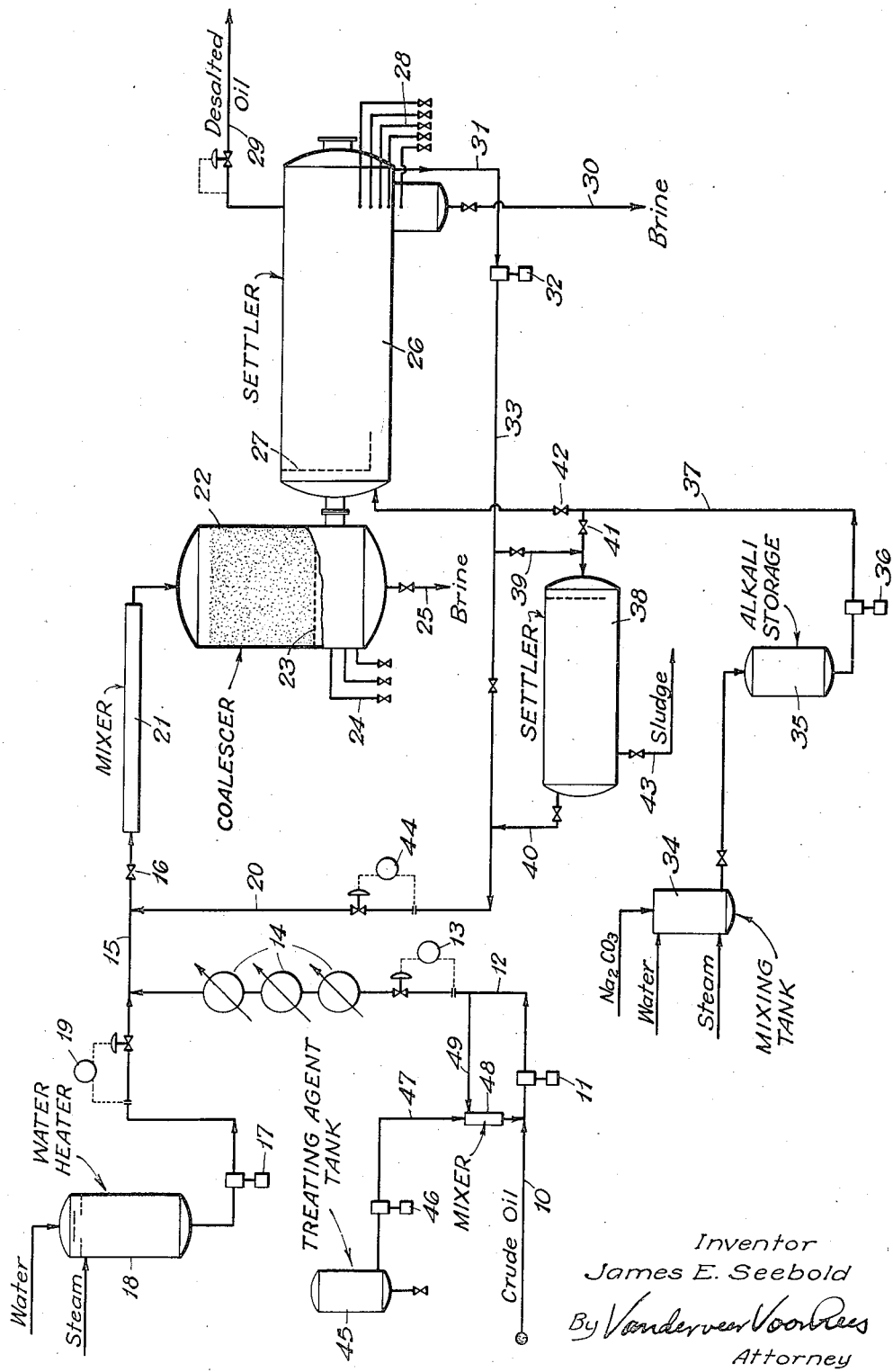

2,440,617

UNITED STATES PATENT OFFICE 2,440,617

OIL DESALTING TECHNIQUE

James E. Seebold, Chicago, Ill., assignor to Standard Oil Company, Chicago, Ill., a corporation of Indiana Application July 23, 1946, Serial No. 685,651

8 Claims. (Cl. 252—330)

This invention relates to the separation of oil emulsions and the desalting of oils, particularly crude petroleum oils, in which brines are emulsified or dispersed in a form difficult to remove by ordinary means. Many methods have been devised for separating such petroleum emulsions and several such methods are in commercial use on a large scale. To be successful it is necessary that a desalting process be able to treat large volumes of oil at a low operating cost, generally a fraction of one cent per barrel. It is not usually necessary to remove the salt completely but if the amount of salt is reduced from a content of about 50 to 300 pounds per thousand barrels down to about 5 to 30 pounds per thousand barrels, the resulting oil is usually satisfactory for ordinary refining operations.

In the main the processes now employed commercially are of two types, electrical and chemical. In the electrical process a crude oil is passed thru a high voltage alternating electric field where the brine particles are coalesced after which they may be separated by gravity settling. In the chemical process there is mixed with the oil a solution of a suitable demulsifying agent after which the oil is passed thru a simple mixing device and coalescer, a baffled pipe or a porous mass of sand, gravel, excelsior, glass wool, or similar material. The coalesced droplets of brine are then separated from the oil by gravity settling. In the chemical process it is usually advantageous to control the hydrogen ion concentration or pH of the oil passed thru the coalescer and this is usually done by the addition of a caustic soda solution. A pH within the range of about 6 to 10 is desirable. pH control may also be employed in the electrical precipitation process.

Some difficulty has been encountered in controlling pH by this method owing to the formation of precipitates from the reaction of the added alkali on alkaline earth and other compounds present in the brine suspended in the oil. The resulting precipitates which may comprise alkaline earth carbonates, hydroxides and the like separate from the brine particularly during its passage thru the mechanical coalescer or in the case of the electrical precipitation process in the electrical precipitator. The usual practice is to inject the proper amount of alkali solution directly into the water stream just prior to mixing with the oil. The precipitate which may even become partially wetted by the oil tends to collect on the oil-water interface and thereby stabilizes the brine dispersion and enhances the difficulty of separation. The alkali also may react with certain emulsifiers present in the oil and give compounds which tend to form emulsions. Even when the separation is obtained in the coalescer, the precipitated material tends to form a sludge or paste of brine, oil and solids difficult to handle. When a mechanical coalescer is employed the precipitate and/or sludge tends to clog the pores of the coalescer and destroy its contacting action on the petroleum emulsion.

It is an object of my invention to prevent the formation of precipitates and sludge in a desalting process of the character described while at the same time obtaining full advantage of pH control in the operation.

My process is illustrated by a drawing which accompanies this application and which shows diagrammatically an apparatus suitable for carrying out the process. Referring to the drawing, crude oil such as a West Texas crude containing about 250 pounds of salt per thousand barrels is introduced by line 10 and charging pump 11 thence by line 12 past flow control 13 and thru heat exchangers 14, wherein the oil is heated to about 150 to 300° F. The oil then passes by line 15 to mixing valve 16. In a typical operation, the pressure at valve 16 may be about 170 pounds per square inch and the temperature 250° F.

A stream of hot water is injected into the oil in line 15 by water pump 17, the water being heated, for example to 200° F., in water heater 18. For this purpose exhaust steam may be used or hot water from condensers or other convenient source may be employed. The amount of water added is usually about 2 to 20 per cent of the volume of crude oil charged, 10 per cent being a typical figure. The rate of water addition is controlled by flow controller 19.

There is also added to the oil in line 15 an alkaline brine solution to be described hereinafter. This solution is introduced by line 20. The three liquids are mixed in mixing valve 16 and further in baffled pipe mixer 21. Valve 16 may be a standard gate valve, the opening of which may be adjusted to provide increased or decreased mixing in the manner of a single orifice mixer. In a typical installation, the pipe mixer 21 may be a pipe about fourteen inches in diameter by 20 feet long provided with transverse baffles, orifice plates, screens or other suitable mixing devices. The pressure drop thru the mixing apparatus may be about 40 p. s. i. in a typical operation. For satisfactory operation, the amount of brine introduced can be about 10 to 30 per cent of the volume of oil treated.

From mixer 21 the mixture of oil, water and brine flows into the upper part of coalescing chamber 22. This is a vertical cylindrical pressure drum provided with a perforated supporting plate 23 in the lower part and packed with a fibrous or granular contacting material above the plate. For the treatment of water-in-oil emulsions, the contacting material is preferably selected to be preferentially water wetted. Suitable contacting materials are excelsior, glass wool, gravel, sand, granulated pumice, silica gel, granulated slag, or slag wool, etc. In a typical operation, the flow of oil thru the packing in the coalescer when using excelsior is about one foot per minute. As the particles of water and brine impinge upon the packing material in the coalescer, they collect into streams and flow downwardly with the oil passing into the base of the coalescer where they form an aqueous layer. The level of the aqueous layer may be determined at any time by try-lines 24. In one method of operation, the brine is discarded from the system by valved line 25 and the amount so discarded may be substantially equivalent to the amount of water added by pump 17.

From coalescer 22 the oil and water suspended therein or otherwise are conducted directly into settling chamber 26. This chamber is suitably a horizontal, cylindrical drum provided with a perforated baffle 27 at the inlet end to prevent currents from the inlet extending into the settler and disturbing the settling operation. An aqueous layer is settled out in the bottom of the settler, the level of which may be determined by try-lines 28. The desalted oil is withdrawn from the top of the settler by line 29. Brine may be discarded from the system by valved line 30. A large part of the brine, however, is withdrawn from the settler by line 31 and recycled by pump 32 in valved lines 33 and 20 back to the mixing valve 16. The amount of brine recycled in a typical operation is suitably about 20 per cent of the volume of oil charged at line 10.

As indicated hereinabove, in order to obtain efficient demulsification in mixers 16 and 21 and coalescer 22, it is desirable to maintain the hydrogen ion concentration above about pH 6 and usually in the range of pH 6 to 10, and preferably about 6 to 8. Sodium carbonate or sodium hydroxide may be added for this purpose, an aqueous solution being prepared in solution tank 34 and stored in tank 35. From here the alkali solution is picked up by proportioning pump 36 and discharged thru valved line 37 into the inlet end of settler 26, pump 36 being controlled to maintain the hydrogen ion concentration of the brine circulating system at the desired level. When injected into the brine in settler 26 in this fashion, precipitated carbonates and hydroxides of calcium, magnesium, aluminum, etc., are settled out in the bottom of the settler as a fine slurry and are discarded from the system thru brine discard outlet 30. The brine which is recycled by line 31 is therefore substantially free of such precipitates.

In an alternative method of operation, I may employ a separate settler 38 for removal of such precipitates. When employing this settler the recycled brine from pump 32 is conducted thru valved line 39 into the settler and out by valved line 40. Alkaline solution is introduced into the recycled brine stream by valved line 41, valve 42 being closed when operating in this manner. Precipitated sludge is discarded from settler 38 by valved line 43. The amount of brine recycled in the system is conveniently controlled by flow controller 44.

With some types of crude oil the breaking of the emulsion and separation of salt brines is facilitated by adding a small amount of a treating agent, usually some form of organic acid such as ricinoleic acid, "green acid" from acid treating of lubricating oils, sulfonated castor oil, oxidized fatty acids or naphthenic acids. This treating agent contained in tank 45 is preferably injected by pump 46 and line 47 directly into the crude oil stream entering the system or into a preliminary mixer 48 thru which a portion of the crude oil is recycled by line 49. The amount required is very small, in a typical case the amount being about .0025 per cent by volume of oil.

Having thus described my invention what I claim is:

1. In the process of desalting petroleum oil wherein the oil is vigorously contacted with a brine solution, thereafter separated from said solution and the separated brine solution is recycled to the contacting step of the process, the improvement comprising controlling the hydrogen ion concentration of said brine solution by adding an alkali thereto after separation from said oil, thereby producing a precipitate and settling said precipitate from said brine solution before recycling said solution to said mixing step.

2. In the process of desalting oils wherein the oil is mixed with water and brine and the resulting mixture is separated into a brine layer and a desalted oil layer, part of the brine layer is recycled to the mixing operation and the hydrogen ion concentration of the brine is controlled in the range of about pH 6 to pH 10 by the addition of a regulated amount of an alkali, the improvement comprising adding said alkali to said brine after separation from said oil and removing from said brine a precipitate of insoluble carbonates and hydroxides formed by the addition of said alkali, said precipitate being removed after adding said alkali to the brine and before mixing the brine with the oil.

3. The process of claim 2 wherein brine in excess of that required for recycling in the system is discarded before the addition of said alkali.

4. The process of desalting oil which comprises heating a stream of salt-obtaining oil to a temperature of about 150 to 300 F., injecting hot water and recirculated brine into the heated oil and mixing them in a continuous mixing zone, conducting the mixture of oil, water and brine thru a coalescing zone to assist in the separation of an aqueous phase in the base of said coalescing zone, discarding an amount of said aqueous brine phase separated in said coalescing zone substantially equal in volume to the amount of water added to said mixing zone, conducting the oil and the remaining brine to a settling zone wherein an aqueous brine phase is separated leaving the oil substantially free of suspended brine, discharging desalted oil from the upper part of said settling zone, maintaining a layer of brine in the base of said settling zone, injecting an alkali solution into the brine layer in said settling zone in an amount sufficient to control the hydrogen ion concentration within the range of about pH 6 to pH 10, thereby resulting in a precipitation of solids objectionable in said mixing and coalescing zones, settling said precipitated solids in said settling zone and recycling brine substantially free of precipitated solids from said settling zone to said mixing zone.

5. The process of desalting oil which comprises heating a stream of salt-containing oil to a temperature of about 150 to 300° F., injecting hot water and recirculated brine into the heated oil and mixing them in a continuous mixing zone, conducting the mixture of oil, water and brine thru a coalescing zone to assist in the separation of an aqueous phase, continuously conducting the stream of oil and brine into one end of an elongated substantially horizontal settling zone wherein coalesced particles of brine are provided time and space to settle from the oil phase, withdrawing from the upper part of said settling zone desalted oil substantially free of suspended brine, collecting in the base of said settling zone a layer of separated brine, injecting into the inlet end of said settling zone a stream of alkali solution sufficient to maintain the hydrogen ion concentration of said brine within the range of about pH 6 to pH 10, thereby resulting in the precipitation of flocculent solids from said brine, collecting said precipitated solids in the base of said settling zone and withdrawing them together with excess brine from a point substantially removed from the inlet end of said settling zone, withdrawing brine substantially free of precipitated solids from the base of said settling zone at a point still further removed from the inlet end thereof and recycling said withdrawn brine stream to said mixing zone for contacting additional amounts of salt-containing oil.

6. The process of claim 5 wherein the amount of brine recycled is about 10 to 30 per cent of the volume of oil treated.

7. The process of desalting oil which comprises heating a stream of salt-containing oil to a temperature of about 150 to 300° F., injecting hot water and recirculated brine into the heated oil and mixing them in a continuous mixing zone, conducting the mixture of oil, water and brine thru a coalescing zone to assist in the separation of an aqueous phase, subjecting the coalesced mixture of oil, water and brine to separation in a separation zone, withdrawing oil substantially free of suspended brine from said separation zone, discarding brine from said separation zone in excess of that required for recycling to said mixing zone, recycling a stream of brine from said separation zone to a hydrogen ion adjusting zone, injecting a controlled amount of alkali into said recycled brine to maintain the hydrogen ion concentration within the range of pH 6 to pH 10, separating precipitated solids from recycled brine in said hydrogen ion adjusting zone, said solids resulting from the action of said alkali on heavy metal salts in said recycled brine and conducting brine substantially free of precipitated solids from said hydrogen ion adjusting zone to said mixing zone for contacting further amounts of salt-containing oil.

8. The process of claim 7 wherein the amount of brine recycled is about 10 to 30 per cent of the volume of oil treated.

JAMES E. SEEBOLD.

REFERENCES CITED

The following references are of record in the file of this patent:

UNITED STATES PATENTS

| Number | Name | Date |
|---|---|---|
| 2,273,915 | Wellman | Feb. 24, 1942 |
| 2,355,076 | Johnson | Aug. 8, 1944 |
| 2,400,713 | Rhees | May 21, 1946 |
| 2,410,970 | Guyer | Nov. 12, 1946 |

OTHER REFERENCES

Blair, Removal of Inorganic Salts from Petroleum Paper Delivered before Western Petroleum Refiner's Assoc., Wichita, Kansas, Mar. 31, 1940, pages 3–11.